(12) United States Patent
Ziemer et al.

(10) Patent No.: US 9,080,648 B2
(45) Date of Patent: Jul. 14, 2015

(54) MULTI-STAGE TRANSMISSION

(71) Applicant: ZF Friedrichshafen AG, Friedrichshafen (DE)

(72) Inventors: Peter Ziemer, Tettnang (DE); Stefan Beck, Eriskirch (DE); Timo Wehlen, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/396,094

(22) PCT Filed: Mar. 13, 2013

(86) PCT No.: PCT/EP2013/055056
§ 371 (c)(1),
(2) Date: Oct. 22, 2014

(87) PCT Pub. No.: WO2013/159987
PCT Pub. Date: Oct. 31, 2013

(65) Prior Publication Data
US 2015/0065290 A1    Mar. 5, 2015

(30) Foreign Application Priority Data
Apr. 27, 2012   (DE) .......................... 10 2012 207 017

(51) Int. Cl.
*F16H 3/66*   (2006.01)
*F16H 3/44*   (2006.01)
*B60K 6/48*   (2007.10)

(52) U.S. Cl.
CPC .................. *F16H 3/44* (2013.01); *F16H 3/666* (2013.01); *B60K 2006/4825* (2013.01);
(Continued)

(58) Field of Classification Search
CPC .................. F16H 2200/2094; F16H 2200/008; F16H 2200/0052; F16H 2200/201; F16H 2200/2043; F16H 2003/445; F16H 2003/447
See application file for complete search history.

(56) References Cited

U.S. PATENT DOCUMENTS 5,429,557 A    7/1995  Beim
5,460,579 A   10/1995  Kappel et al.
(Continued)

FOREIGN PATENT DOCUMENTS

DE        44 05 048 A1    9/1994
DE       102 50 371 A1    5/2003
(Continued)

OTHER PUBLICATIONS

German Search Report Corresponding to 10 2012 207 017.6 mailed Dec. 19, 2012 6 pages.
(Continued)

*Primary Examiner* — Justin Holmes
(74) *Attorney, Agent, or Firm* — Davis & Bujold, P.L.L.C.; Michael J. Bujold

(57) ABSTRACT

A two-step multi-step transmission in which a first planetary gear set (1) has two radially nested transmission sub-assemblies. The first planetary gearset has an inner sun gear (11), inner planetary gears (12), an outer sun gear (14) which is rotationally fixed to the inner ring gear (13), outer planetary gears (15), an outer ring gear (16), and a carrier (17) on which the inner planetary gears (12) and the outer planetary gears (15) are mounted. The inner ring gear (13) and the outer sun gear (14), respectively, are rotationally fixed to a second, traditionally designed planetary gear set (2) and can be locked via a brake (42).

9 Claims, 2 Drawing Sheets

(52) U.S. Cl.
CPC .. *F16H 2003/442* (2013.01); *F16H 2200/0008* (2013.01); *F16H 2200/0052* (2013.01); *F16H 2200/201* (2013.01); *F16H 2200/2043* (2013.01); *F16H 2200/2094* (2013.01); *Y02T 10/6252* (2013.01)

(56) References Cited

U.S. PATENT DOCUMENTS

| | | |
|---|---|---|
| 6,962,549 B2 | 11/2005 | Dreibholz et al. |
| 7,094,174 B2 | 8/2006 | Miyazaki et al. |
| 7,097,582 B2 | 8/2006 | Bauknecht et al. |
| 8,043,190 B2 | 10/2011 | Phillips |
| 8,277,355 B2 | 10/2012 | Hart et al. |
| 8,398,522 B2 | 3/2013 | Bauknecht et al. |
| 2008/0009385 A1* | 1/2008 | Kamm et al. ............... 475/296 |
| 2008/0202884 A1* | 8/2008 | Nishida et al. ............ 192/106 F |
| 2010/0041507 A1* | 2/2010 | Gumpoltsberger et al. .. 475/275 |
| 2013/0288847 A1* | 10/2013 | Scherer et al. ............... 475/275 |
| 2014/0256497 A1* | 9/2014 | Ishikawa et al. ............. 475/269 |
| 2015/0031494 A1* | 1/2015 | Otake et al. .................. 475/275 |

FOREIGN PATENT DOCUMENTS

| | | |
|---|---|---|
| DE | 102 21 097 A1 | 11/2003 |
| DE | 102 44 023 A1 | 4/2004 |
| DE | 10 2008 000 429 A1 | 9/2009 |
| DE | 10 2010 005 737 A1 | 9/2010 |
| DE | 10 2011 106 551 A1 | 1/2012 |
| EP | 1 236 930 A2 | 9/2002 |
| JP | 2010-101404 A | 5/2010 |

OTHER PUBLICATIONS

International Search Report Corresponding to PCT/EP2013/055056 mailed Jun. 26, 2013 6 pages.
Written Opinion Corresponding to PCT/EP2013/055056 mailed Jun. 26, 2013 9 pages.

* cited by examiner

MULTI-STAGE TRANSMISSION

This application is a National Stage completion of PCT/EP2013/055056 filed Mar. 13, 2013, which claims priority from a German patent application serial no. 10 2012 207 017.6 filed Apr. 27, 2012.

FIELD OF THE INVENTION

The invention concerns a multi-stage transmission in a planetary construction, in particular for a motor vehicle, comprising:

a first planetary gear set having an inner sun gear, planetary gears which mesh with the inner sun gear, an inner ring gear which meshes with the inner planetary gears, an outer sun gear which is connected in a rotationally fixed manner with the inner ring gear, outer planetary gears which mesh with the outer sun gear, an outer ring gear which meshes with the outer planetary gears, and a carrier on which the inner planetary gears and outer planetary gears are mounted, and a second planetary gear set with a sun gear, inner planetary gears which mesh with the sun gear, outer planetary gears which mesh with the inner planetary gears, and a ring gear which meshes with the outer planetary gears, and a carrier on which the planetary gears are mounted.

Such multi-gear transmissions are preferably utilized as automatic transmissions for motor vehicles, whereby the effective flow of force in the respective gear steps within the planetary sets is defined through selective activation of the shift elements. Hereby, the planetary sets in an automatic transmission are also usually connected to a starting element, if desired with a bridging clutch, which provides a slippage effect, such as for instance a hydrodynamic torque converter or a turbo coupling.

BACKGROUND OF THE INVENTION

A two-step multistep transmission of the previously discussed type, in which a first planetary gear set comprises of two radially nested transmission sub-assemblies, which is coupled with a second planetary set in a traditional construction, is known through U.S. Pat. No. 5,429,557. A disadvantage in this known multi step transmission is the nesting of the particular parts, especially the coupling of the two gear sets is in comparison rather complex.

SUMMARY OF THE INVENTION

Therefore, the task of the invention is to show an improved multistep transmission and in particular, the coupling between the two planetary gear sets needs to be simplified.

The task of the invention is solved through a two-step multistep transmission of the above mentioned art, in which the sun gear of the first planetary gear set can be coupled through a first clutch with a drive, the carrier of the second planetary gear set can be coupled by a first brake with the housing, the sun gear of the second planetary gear set is connected in a rotationally fixed manner with the drive and the ring gear of the second planetary gear set is connected in a rotationally fixed manner with the inner ring gear and the outer sun gear of the first planetary gear set, the inner ring gear and the outer sun gear of the first planetary gear set can be coupled through a second brake with the housing, the carrier of the first planetary gear set can be coupled through a third brake with the housing, the carrier of the first planetary gear set can be coupled through a second clutch with the drive, and the outer ring gear of the first planetary gear set is connected in a rotationally fixed manner with the output.

Through the selected configuration, it can be achieved that the shift elements, meaning the brakes and clutches at the transmission side, are well accessible from the outside. Thus, actuators such as for instance electric motors, hydraulic valves, hydraulic pumps or similar can be positioned near the shift elements which reduces mechanical and/or hydraulic losses, and less energy might be needed for the actuation of the shift elements. Also, less energy might be needed to keep the shift element in each of its actual operating modes, meaning disengaged or engaged, where, for instance, the pressure losses are also lower through shorter pipes. It is also possible to position the shift elements on the housing and thus at least partially rotationally fixed, whereby gaskets which connect a fixed pipe with a rotating pipe, can be completely or partially omitted.

Also, the spatial positioning of the well accessible shift elements simplifies the replacement of the traditional, hydraulically actuated disc clutches or disc brakes with, for instance, electro-mechanically or electro-hydraulically actuated brakes and clutches, which in comparison can be actuated very simply. Easily accessible shift elements are, on one hand, brakes, which connect a shaft with the housing in a rotationally fixed manner, but also shift elements and outer positioned shafts of the multistep transmission, preferably at a drive shaft or output shaft, where in comparison the needed hydraulic fluid for the activation can easily be supplied.

Beside this characteristic, the named multistep transmission also has at the same time good gear efficiency, low stress on parts, in particular low planetary set and shift element torques, low absolute and relative rotational speeds, as well as a lower need for construction space. The latter enables the multistep transmission to be realized with lower weight and lower cost. In particular, the length of the proposed transmission is extremely short. Therefore, the multistep transmission is preferably constructed as a drive with a front-transverse configuration. In particular, the transmission can also be utilized, due to its short length, in hybrid drives (for instance combustion engines and electric machines). Finally, the multistep transmission also enables a good gear ratio sequence, meaning a well applicable gradation of the gear steps.

In general, the named multistep transmission has two planetary gear sets, two clutches, and three brakes. By actuating two shift elements (brakes and clutches), six forward gears and one reverse gear can be shifted.

A hydrodynamic torque converter, a hydrodynamic clutch, an additional starting clutch, an integrated starting clutch or brake, and/or an additional e-machine can serve as starting elements.

The geometric positioning (sequencing) of the individual gear sets and shift elements is freely selectable, as long as the specifications of the elements can handle it. Thus, the position of individual elements can be moved.

BRIEF DESCRIPTION OF THE DRAWINGS

Additional, advantageous variations of the multistep transmission result from the description in connection with the drawings. For a better understanding of the invention, it is further explained based on the following drawings. Each show in a simplified format.

DETAILED DESCRIPTION OF THE PREFERRED EMBODIMENTS

By way of introduction it should be noted that in the different embodiments described like parts have like reference numbers or same component names, the disclosure contained in the description can be usefully applied to the same parts with the same reference numbers or same component names. Also, the wording of positions which has been used in the description, such as for instance top, bottom, side etc., refers to the specific and presented drawings and can be applied accordingly to new positions in the case of a change of the position. In addition, also individual features or combinations of features of the presented and described drawings of the different embodiments can represent by themselves either inventive or the invention related solutions.

Figure 1:
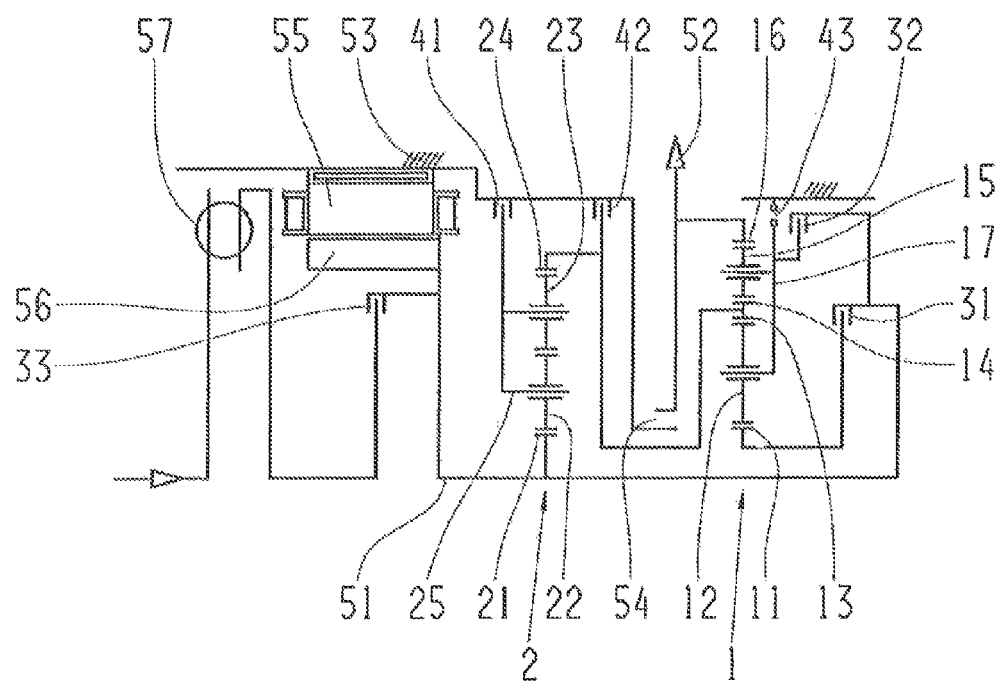
FIG. 1 a first schematically presented variation of a multistep transmission in accordance with the invention, and FIG. 2 a section cut through a multistep transmission in accordance with the invention.

FIG. 1 shows a first schematically presented variation of a multistep transmission in accordance with the invention and with two planetary gear sets.

The first planetary gear set is comprised of an inner sun gear 11, inner planetary gears 12 which mesh with the inner sun gear 11, an inner ring gear 13 which meshes with the inner planetary gears 12, and outer sun gear 14 which is connected in a rotationally fixed manner with the inner ring gear 13, outer planetary gears 15 which mesh with the outer sun gear 14, and an outer ring gear 16 which meshes which the outer planetary gears 15, as well as a carrier 17 on which the inner planetary gears 12 and outer planetary gears 15 are mounted.

In this example, the second planetary gear set 2 is designed as a plus-gear set. It is therefore comprised of a sun gear 21, inner planetary gears 22 which mesh with the sun gear 21, the inner planetary gears 22 mesh with the outer planetary gears 23 which mesh with the ring gear 24, as well as a carrier 25 on which the planetary gears 22, 23 are mounted, The chosen construction advantageously results in a relatively low rotational speed of the planetary gears 22 and 23 of the second planetary gear set.

In the multistep transmission of FIG. 1
- the sun gear 11 of the first planetary gear set 1 can be coupled, via a first clutch 31, with a drive 51,
- the carrier 25 of the second planetary gear set 2 can be coupled, via a first brake 41, with the housing 53,
- the sun gear 21 of the second planetary set 2 is connected in a rotationally fixed manner with the drive 51, and the ring gear 24 of the second planetary gear set 2 is connected in a rotationally fixed manner with the inner ring gear 13 and with the outer sun gear 14 of the first planetary set 1,
- the inner ring gear 13 and the outer sun gear 14 of the first planetary gear set 1 can be coupled, via a second brake 42, with the housing 53,
- the carrier 17 of the first planetary gear set 1 can be coupled, via a third brake 43, with the housing 53,
- the carrier 17 of the first planetary gear set 1 can be coupled, via a second clutch 32, with the drive 51 and
- the outer ring gear 16 of the first planetary gear set 1 is connected in a rotationally fixed manner with an output 52.

FIG. 1 also presents a journal 54 which is positioned between the first planetary gear set 1 and the second planetary gear set 2, a stator 55 of an electric machine which is connected in a rotationally fixed manner with the housing 53 of the multistep transmission, a rotor 56 of the electric machine is connected in a rotationally fixed manner with the drive 51, and an optional vibration damper 57 which is added into the drive train. Finally, also a third clutch 33 is provided to selectively utilize the electric machine 55, 56, or a combustion engine (not shown), for the creation of the movement. Naturally, the clutch 33 can be omitted if only the electric machine 55, 56 is provided on the drive side. Generally, the clutch 33 can also be omitted when a combustion engine is used, as it will be explained later.

The following gears can be shifted by the activation of the named elements
- a first gear through a first clutch 31 and third brake 43,
- a second gear through first clutch 31 and second brake 42,
- a third gear through first clutch 31 and first brake 41,
- a fourth gear through first clutch 31 and second clutch 32.
- a fifth gear through second clutch 32 and first brake 41,
- a sixth gear through second clutch 32 and second brake 42, and
- a reverse gear through first brake 41 and third brake 43, wherein each of the elements not mentioned are not activated or rather disengaged.

In an especially preferred embodiment of the multistep transmission, the gear ratio is:
- of the first planetary gear set 1 between the inner sun gear 11 and inner ring 12 is equal to −2.5 and
- of the first planetary gear set 1 between the outer sun gear 14 and outer ring gear 16 is equal to −1.46 and
- of the second planetary gear set 2 between the sun gear 21 and the ring gear 24 equal to +2.5.

Hereby, an especially advantageous stepping of the gears arises.

All shift elements in principle can be friction or form-fitted. However, it is an advantage if, as presented in this example, the third brake 43 is designed as a claw brake and the first clutch 31 and the first brake 41 as a friction shift element. It is also hereby an advantage that the first clutch 31 and the first brake 41 are designed as starting elements. Thus, no frictional losses occur at the third brake 43. At the same time, a starting element in the form of a seperate clutch 33, as it is commonly used, can be omitted. The transmission is therefore constructed especially short. Referring to the above mentioned shift positions, the first clutch 31 is used as the starting element in the first gear and the first break 41 as the starting element in the reverse gear. Advantageous the support factor (ratio between the clutch or brake torque, respectively, and the transmission input torque) of the first clutch 31 in this transmission configuration is equal to 1, and the support factor of the first brake 41 is even reaching <1.

It is also possible that the third brake 43 is designed as friction shift element and the first clutch 31 as a claw clutch. It is hereby also an advantage if the third brake 43 is designed as a starting element. Thus, no friction losses occur at the first clutch 31. At the same time, the starting element in the form of a seperate clutch 33, as they are commonly used, can again be omitted. Also in this case, the construction of the transmission is especially short.

In both above named cases, the application of claw clutches or claw brakes, respectively, is not necessarily mandatory. Instead, also the application of low load friction elements can be assumed.

Figure 2:
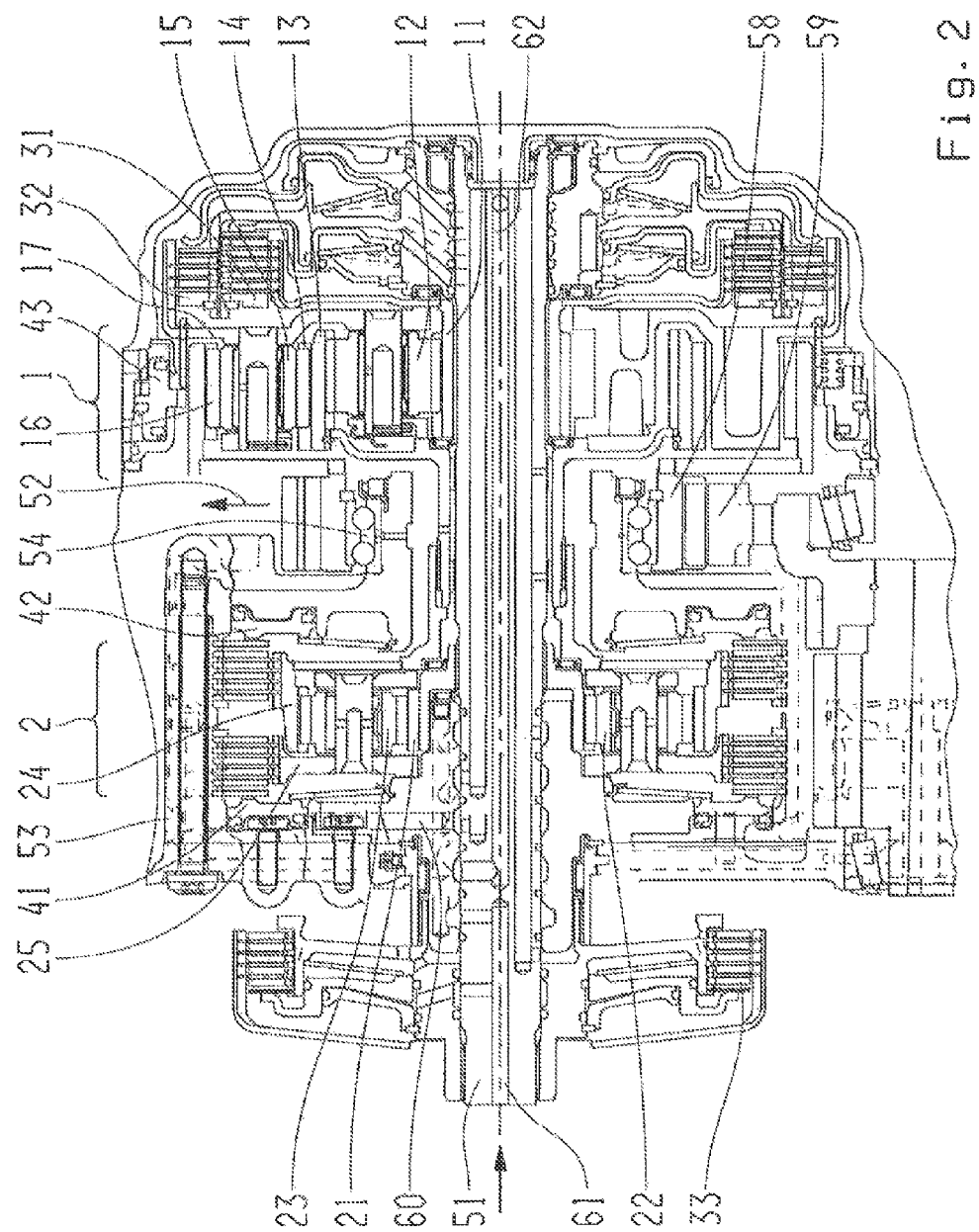

FIG. 2 illustrates a sectional view of a multi-step transmission which relates to the schematically presented embodiment in FIG. 1.

In this example, a spur gear transmission step is again provided at the output side. It can also be seen in FIG. 2 that the outer ring gear 16 of the first gear set 1 drives the first spur gear 58 which meshes with the second spur gear 59 and which has a journal 54. In this construction of the multistep transmission, an advantage arises that, through the journal of the first spur gear 58, the outer ring gear 16 of the first gear set 1 is axially secured. In addition and through the selected construction, the inner ring gear 13 of the first gear set 1 which is combined with the outer sun gear 14, and the ring gear 24 of the second gear set 2, can be axially secured without any large construction effort.

It is also particularly favorable when the connections 60, for connecting an external oil supply of the transmission as shown in FIG. 2, are designed through one or more bores 61, positioned in the driveshaft 51 and brought to the drive side, and several bores 62 brought to the output side. For instance, the flow of the pressure oil, lubrication oil, and/or lubrication oil can take place through one or several bore(s) 61 which are brought to the drive side, as well as one or several additional longitudinal bore(s) 62 in the driveshaft 51. Thus, radial bores at the side facing away from the drives, as they are commonly used, can be omitted. Hereby, the construction length of the transmission can be further reduced.

REFERENCE CHARACTERS

1 First Planetary gear Set
2 Second Planetary gear Set
11 inner Sun Gear of the first planetary gear set
12 inner planetary gears of the first planetary gear set
13 inner ring gear of the first planetary gear set
14 outer sun gear of the first planetary gear set
15 outer planetary gears of the first planetary gear set
16 outer ring gear of the first planetary gear set
17 carrier of the first planetary gear set
21 sun gear of the second planetary gear set
22 inner planetary gears of the second planetary gear set
23 outer planetary gears of the second planetary gear set
24 ring gear of the second planetary gear set
25 carrier of the second planetary gear set
31 first clutch
32 second clutch
33 third clutch
41 first brake
42 second brake
43 third brake
51 drive/driveshaft
52 output
53 housing
54 journal
55 Stator electric machine
56 rotor electric machine
57 vibration damper
58 first spur gear
59 second spur gear
60 connections for oil supply
61 oil bore
62 oil bore

The invention claimed is:

1. A multi-step transmission with two transmission gear sets (1, 2), comprising:
a first planetary gear set (1) with an inner sun gear (11), inner planetary gears (12) meshing with the inner sun gear (11), an inner ring gear (13) meshing with the inner planetary gears (12), and an outer sun gear (14) being connected, in a rotationally fixed manner, with the inner ring gear (13), outer planetary gears (15) meshing with the outer sun gear (14), and an outer ring gear (16) meshing with the outer planetary gears (15), and the inner planetary gears (12) and the outer planetary gears (15) being mounted on a carrier (17),
a second planetary gear set (2) with a sun gear (21), inner planetary gears (22) meshing with the sun gear (21), outer planetary gears (23) meshing with the inner planetary gears (22), and a ring gear (24) meshing with the outer planetary gears (23), and the inner and the outer planetary gears (22, 23), of the second planetary gear set, being mounted a carrier (25),
the inner sun gear (11) of the first planetary gear set (1) being connectable, via a first clutch (31), with a drive input (51),
the carrier (25) of the second planetary gear set (2) being connectable, via a first brake (41), with a housing (53),
the sun gear (21) of the second planetary gear set (2) being connected, in a rotationally fixed manner, with the drive input (51),
the ring gear (24) of the second planetary set (2) being connected, in a rotationally fixed manner, with the inner ring gear (13) and the outer sun gear (14) of the first planetary gear set (1),
the inner ring gear (13) and the outer sun gear (14) of the first planetary gear set (1) being connectable, via a second brake (42), with the housing (53),
the carrier (17) of the first planetary gear set (1) being connectable, via a third brake (43), with the housing (53),
the carrier (17) of the first planetary gear set (1) being connectable, via a second clutch (32), with the drive input (51), and
the outer ring gear (16) of the first planetary gear set (1) being connected, in a rotationally fixed manner, with a drive output (52).

2. The multi-step transmission according to claim 1, wherein the first and the second clutches and the first, the second and the third brakes are selectively engaged to implement a plurality of gears,
a first gear is implemented by engagement of the first clutch (31) and the third brake (43),
a second gear is implemented by engagement of the first clutch (31) and the second brake (42),
a third gear is implemented by engagement of the first clutch (31) and the first brake (41),
a fourth gear is implemented by engagement of the first clutch (31) and the second clutch (32),
a fifth gear is implemented by engagement of the second clutch (32) and the first brake (41),
a sixth gear is implemented by engagement of he second clutch (32) and the second brake (42),
a reverse gear is implemented by engagement of the first brake (41) and the third brake (43), and
each of the first, the second, the third, the fourth, the fifth, the sixth gears and the reverse gear is implemented by engagement of only two of the first clutch, the second clutch, the first brake, the second brake and the third brake.

3. The multi-step transmission according to claim 1, wherein a spur gear transmission step (58, 59) is provided at an output side of the transmission.

4. The multi-step transmission according to claim 1, wherein the third brake (43) is a claw brake, and the first clutch (31) and the first brake (41) are friction shift elements.

5. The multi-step transmission according to claim 4, wherein the first clutch (31) and the first brake (41) are designed as starting elements.

6. The multi-step transmission according to claim 1, wherein the third brake (43) is a friction shift element and the first clutch (31) is a claw clutch.

7. The multi-step transmission according to claim 6, wherein the third brake (43) is a starting element.

8. The multi-step transmission according to claim 1, wherein connections (60) for an external oil supply of the transmission are designed exclusively with bores (61) which are in the drive input (51) and are brought to a drive side, and brought to the output side through at least further bore (62).

9. a multi-step transmission with two transmission gear sets (1, 2), the transmission comprising:
   an input shaft and an output shaft;
   first and second planetary gear sets;
   a plurality of shift elements comprising first and second clutches and first, second and third brakes, and selective engagement of two of the first clutch, the second clutch, the first brake, the second brake and the third brake implements six forward gears and a reverse gear;
   the first planetary gear set comprising inner and outer sun gears, inner and outer planet gears, and inner and outer ring gears, the inner sun gear of the first planetary gear set meshing with the inner planetary gears of the first planetary gear set, and the inner planetary gears of the first planetary gear set being rotatably supported by a planet carrier of the first planetary gear set and meshing with the inner ring gear of the first planetary gear set, the outer sun gear of the first planetary gear set meshing with the outer planetary gears of the first planetary gear set, and the outer planetary gears of the first planetary gear set being rotatably supported by the planet carrier of the first planetary gear set and meshing with the outer ring gear of the first planetary gear set, and the inner ring gear of the first planetary gear set being formed integral with the outer sun gear of the first planetary gear set to prevent relative rotation therebetween;
   the second planetary gear set comprising a sun gear, inner and outer planetary gears, and a ring gear, the sun gear of the second planetary gear set meshing with the inner planetary gears of the second planetary gear set, the ring gear of the second planetary gear set meshing with the outer planetary gears of the second planetary gear set, and the inner and the outer planetary gears of the second planetary gear set meshing with one another and both being rotatably supported by a carrier of the second planetary gear set;
   the inner sun gear of the first planetary gear set being connectable, via the first clutch, to the input shaft;
   the carrier of the second planetary gear set being connectable, via the first brake, to a housing;
   the sun gear (21) of the second planetary gear set (2) being continuously connected with the input shaft to prevent relative rotation therebetween, and the ring gear (24) of the second planetary set (2) being continuously connected with both the inner ring gear (13) and the outer sun gear (14) of the first planetary gear set (1) so as to prevent relative rotation therebetween;
   the inner ring gear (13) and the outer sun gear (14) of the first planetary gear set (1) being connectable, via the second brake, with the housing,
   the carrier of the first planetary gear set being connectable, via the third brake, with the housing;
   the carrier of the first planetary gear set being connectable, via the second clutch, with the input shaft, and
   the outer ring gear of the first planetary gear set being continuously connected with the output shaft to prevent relative rotation therebetween.

* * * * *